July 31, 1962 K. D. SCHREYER 3,047,125
FEEDER CONVEYOR
Filed July 18, 1960 2 Sheets-Sheet 1
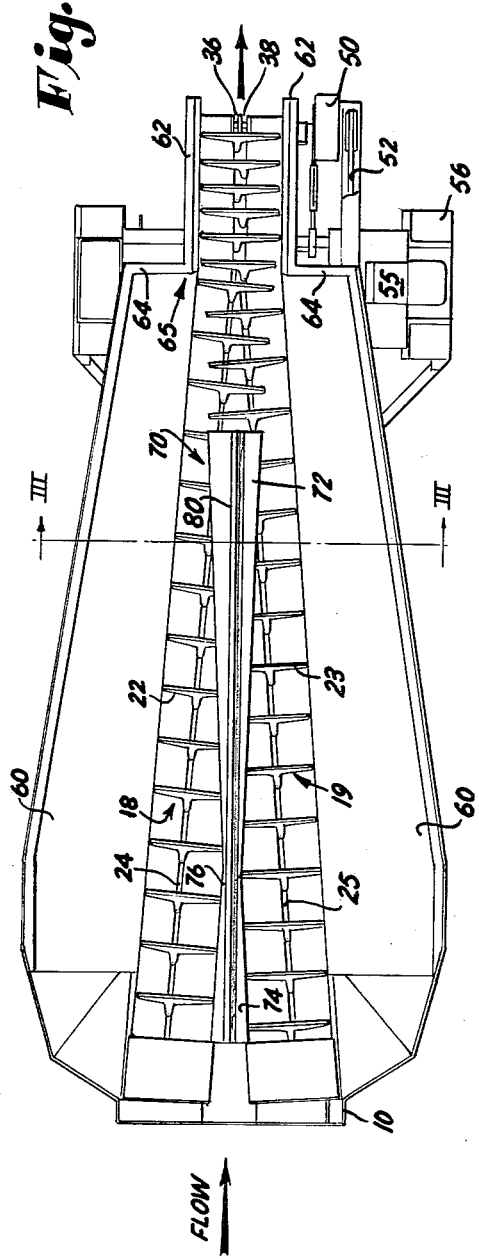
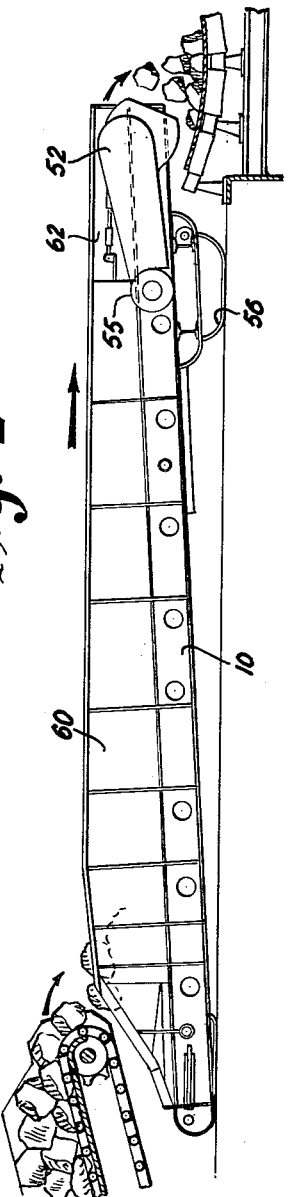
INVENTOR.
KENNETH D. SCHREYER
BY
Beau, Brooks, Buckley & Beau.

July 31, 1962
K. D. SCHREYER
3,047,125
FEEDER CONVEYOR
Filed July 18, 1960
2 Sheets-Sheet 2
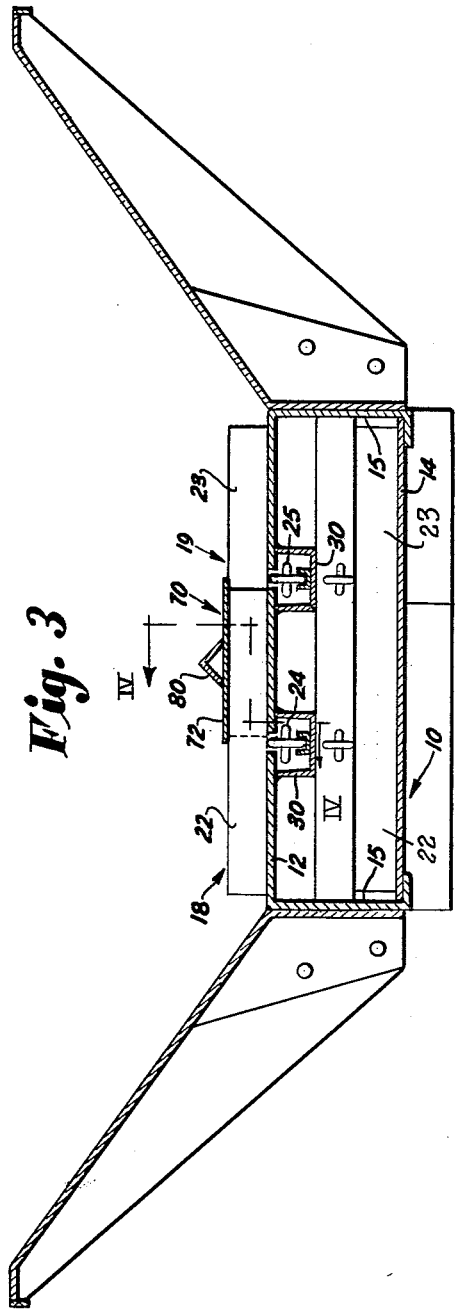
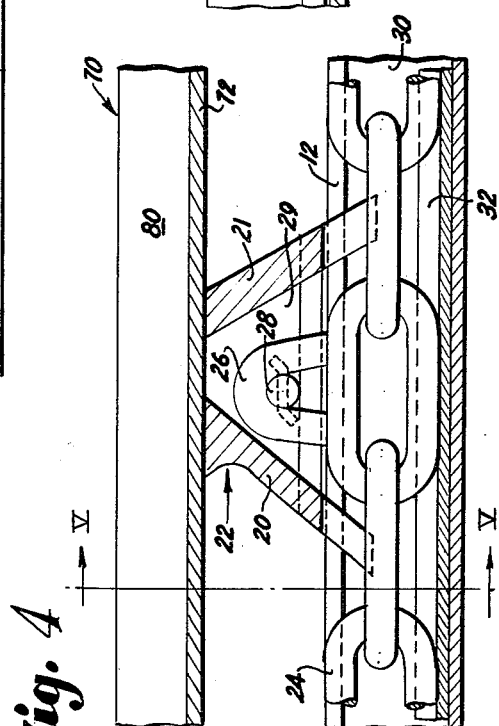
INVENTOR.
KENNETH D. SCHREYER
BY
Beau, Brooks, Buckley & Beau.

3,047,125
Patented July 31, 1962

1

3,047,125
FEEDER CONVEYOR
Kenneth D. Schreyer, Williamsville, N.Y., assignor to Columbus McKinnon Corporation, Tonawanda, N.Y.
Filed July 18, 1960, Ser. No. 43,419
6 Claims. (Cl. 198—57)

This invention relates to coal mining machinery or the like, of the type known as feeders adapted to receive batch loads, such as of mined coal, ore, rock, or other lump or granular materials, from shuttle cars or the like to deliver the material at reduced but uniform rates such as to mine panel conveyors, elevators, or other handling equipment. Specifically the present invention relates to improvements in feeders such as disclosed in my copending application Serial No. 743,863 filed June 23, 1958.

It is a primary object of the present invention to provide in a machine as aforesaid, in combination, a novel arrangement of plural conveyors and an improved load levelling device whereby the machine will be adapted to receive successive loadings from batch conveyances or the like at the maximum rates of discharge thereof so as to quickly release such conveyances for return trips, while operating with improved facility to integrate the feed material into a delivery flow of uniform rate.

Another object of the inveniton is to provide a novel feeder machine as aforesaid which is particularly suited for use under low coal seam mining conditions.

Other objects and advantages of the invention will appear from the specification hereinafter.

In the accompanying drawings:

FIG. 1 is a top plan view of a feeder embodying a load leveller of the present invention;

FIG. 2 is a side elevational view thereof;

FIG. 3 is a fragmentary enlarged scale transverse sectional view taken along line III—III of FIG. 1;

FIG. 4 is a fragmentary sectional view on still further enlarged scale, taken along line IV—IV of FIG. 3; and FIG. 5 is a fragmentary sectional view taken along line V—V of FIG. 4.

The invention contemplates generally a feeder for coal or the like which comprises a V-shaped bed plate traversed by a plurality of scraper conveyors which are relatively convergent and moving toward the apex end of the bed plate. Hence, batch loads of feed material may be intermittently dumped upon the broad end of the bed plate whereupon it is gathered and funneled by the converging conveyors into the form of a reduced rate delivery flow at the apex or discharge end of the machine. Thus, the machine is adapted to receive either constant or intermittent feed supplies while delivering a substantially uniform flow of material to the receiver which may comprise an elevator or mine panel conveyor belt, or the like.

For example, as shown in the drawing herewith the feeder may be constructed to comprise a box-sectioned bottom or keel portion designated 10 which may be constructed as shown in FIG. 3 to comprise upper and lower bed plates 12, 14, respectively, which are interconnected by side wall plates 15—15. As shown in FIG. 1 this base structure is of truncated triangle form in plan view; being substantially wider at the intake end portion of the machine compared to the discharge end portion thereof. As illustrated in FIGS. 3–6, the bottom plate 12 is longitudinally slotted to accommodate the desired number of convergent conveyor components, consisting in the example illustrated of two scraper conveyors as indicated generally at 18, 19. Thus, the slots accommodate in free-sliding relation therein the fore and aft leg portions 20, 21 of corresponding series of scraper conveyor flights 22, 23 carried in spaced relation on corresponding separate endless link chains 24, 25.

2

Thus the leg portions 20, 21 stabilize the flights against forces tending to cause them to twist such as responsive to unequal loadings on the flights at opposite sides of the power chain, and such as would otherwise cause twisting and tightening of the chain resulting in excessive loads and wear upon the chain and sprocket system. Also, this arrangement minimizes the frictional resistance to the conveyor operation. As shown in the drawing, the chains 24, 25 are of the welded link type being thereby freely flexible in two directions; one link of each chain at the position of each flight being formed with an integrally extending eye portion 26 (FIGS. 4 and 5) receiving a mounting pin 28 carried by clevis portions 29—29 of the flight members.

The horizontally disposed links of the chains 24, 25 ride under the plate 12 and thus "hold down" the chains and flights against any tendency to ride up over the material being handled.

Just below the chain slots the top plate 12 carries channels 30 supporting grooved slide rails 32 which receive and vertically support the lower edges of the vertically disposed links of the upper strands of the power chains while their upper edges are slidably stabilized in the slots. The chains 24, 25 train at the feed receiving end of the machine around suitable and relatively widely spaced apart idling sprocket wheels; and at the discharge end of the machine they train around closely adjacent sprocket wheels 36, 38. The flights 22, 23, are positioned on the chains 24, 25 so as to mesh without relative interference as they train around the wheels 36, 38.

The sprocket wheels 36, 38 at the discharge end of the machine are carried by a shaft which is journalled on the machine frame and driven for example through a speed reducer 50 by means of a belt and pulley system 52 and an electric motor 55 which is conveniently mounted on a skid frame 56 disposed to extend as a sub-assembly beneath the discharge end portion of the machine frame.

As illustrated herein, sheet metal hopper sides 60—60 are provided at opposite sides of the feed receiving end of the machine, to retain the coal or other feed material in gravity-feeding relation to the scraper conveyor components. At the discharge end of the machine a pair of substantially vertically standing side boards 62—62 are provided to meter the discharge flow of material from the feeder at the desired rate. Intermediately of the main hopper and meter board portions of the conveyor are provided opposed "throttling" boards 64—64 joining the meter boards 62—62 at a "choke" station 65 (FIG. 1).

It is a particular feature of the machine of the invention that a load flow control and levelling plate of novel form is provided, as indicated generally at 70 in the drawing. As shown herein, this levelling plate may be fabricated in the form of a flat metal strip 72 disposed horizontally and lengthwise of the machine. In plan view of the machine, the flow control plate 72 is dimensioned to extend from the intake end of the machine along the center line thereof to a point short of the choke station 65; the control plate being shaped in plan view adjacent the intake end of the machine to substantially cover only the otherwise open space between the paths of the converging conveyor flights. Thus, as shown in FIG. 1, the control plate will include a front end portion 74 which overhangs the adjacent edges of the conveyor flights as they travel away from the intake end of the machine, and tapers down to a slim-waist portion 76 which is substantially coincident with the zone at which the conveyor flights commence to intermesh.

From then on the control plate reverse-tapers and gradually widens out through its extent toward the discharge end of the machine; and throughout this area it progressively covers more substantial portions of the paths occupied by the conveyors. To mount the control plate in the manner described, the intake end portion 74 thereof may be conveniently fixed in vertically spaced relation to the upper bed plate 12 by any suitable posts or spacer devices extending between the bed plate and the control plate between the paths of the conveyor flights without interference therewith. Thus, the control plate may be readily mounted to extend in cantilever beam relation at its forward end so as to avoid interference with the conveyor flights, while throughout its length the control plate overlaps the ends of the conveyor flights and thus operates to hold them down against the bed plate, thereby preventing them from "jumping" out of normal scraper-conveying positions. To stiffen the cantilever beam mounting effect, the control plate 72 may be structurally reinforced as by welding along the top center line thereof an angle iron such as indicated at 80 in the drawing herewith.

In operation, the flow control plate of the invention acts to modify the driving power of the conveyors in relation to the load in the longitudinally central portion of the machine, and reduces the tendency of the conveyors at this section of the machine to build up the height of the coal load in the region just ahead of the choke station 65. Thus, overloading of the machine in this area is prevented, such as would otherwise build up the coal load against the mine roof and possibly cause it to overrun the hopper walls in this area. In lieu thereof the control plate of the invention functions to decrease the effective grip of the scraper conveyor flights upon the total traveling load mass in the region just ahead of the choke station, and thereby functions to avoid overloadings of the machine in that area and "levels out" the flow of material through the machine.

Also, it will be appreciated that the flow control plate of the invention may be employed to control the height of the material load entering the discharge chute portion of the machine, and thereby the discharge rate of the machine. Thus, the flow control plate may be designed and dimensioned so as to provide a prescribed control of the machine discharge rate, in lieu of the conventional technique of controlling the discharge rate by regulating the speeds of the conveyors.

Thus, the present invention provides means for obtaining a novel material flow levelling and discharge rate control in feeders of the type referred to herein; and it will of course be appreciated that whereas only one form of the invention has been illustrated and described in detail hereinabove, it will be understood that various changes may be made therein without departing from the spirit of the invention or the scope of the following claims.

I claim:

1. A material feeder for receiving loadings of material and delivering the same at a uniform rate of discharge, said feeder comprising a portable unit including a base plate substantially bounded by hopper walls and slotted in plan-view converging relation, a plurality of conveyor components each comprising an endless power chain having a top strand portion sliding within one of said slots and mounting transversely disposed conveyor flights at relatively spaced apart positions, said slots being arranged in relatively close relation at the discharge end of the feeder while being relatively widely spaced apart at the load receiving end of the feeder, said flights being arranged on said strands so as to gather the material loadings and to deliver the material at the discharge end of the feeder while intermeshing thereat, and a load flow control device comprising a flat plate disposed above said conveyors and running lengthwise of said feeder from a position at the intake end thereof between said conveyors along the plan view center line thereof, said plate being plan-view shaped so as to leave the conveyor paths at the intake end of said machine substantially uncovered and shaped so as to progressively cover more substantial portions of the paths of said conveyors as they approach the discharge end of said feeder.

2. A discrete material feeder for receiving batch loadings of material and delivering the same at a uniform reduced rate of discharge, said feeder comprising a unit machine including a plurality of conveyor components moving convergently towards the discharge end thereof, said conveyor components each comprising a power strand mounting transversely disposed flights, said strands being arranged in relatively close relation at the discharge end of the feeder while being relatively widely spaced apart at the load receiving end of the feeder, said flights being arranged on said strands so as to gather the material loadings and to deliver the material at the discharge end of the feeder while the flights of adjacent conveyor components intermesh without relative interference as they successively approach the discharge end of the feeder, and a load flow control plate disposed above said conveyors and shaped to leave the intake end portions thereof substantially uncovered while covering substantial portions of the conveyor paths in the longitudinally central portion of the machine ahead of the discharge end thereof.

3. A material feeder for receiving batch loadings of material and delivering the same at a uniform rate of discharge, said feeder including a base plate substantially bounded by hopper walls, a plurality of conveyor components sliding convergently along said base plate and mounting transversely disposed conveyor flights at relatively spaced apart positions, said conveyors being arranged in relatively close relation at the discharge end of the feeder while being relatively widely spaced apart at the load receiving end of the feeder, said flights being arranged on said conveyor components so as to gather the material loadings and to deliver the material at the discharge end of the feeder while intermeshing thereat, and a load flow control device disposed above said conveyors and running lengthwise of said feeder from a position at the intake end thereof along the plan view center line thereof, said masking device being plan-view shaped so as to leave the conveyor paths at the intake end of said machine substantially uncovered and shaped so as to progressively cover more substantial portions of the paths of said conveyors as they approach the discharge end of said feeder.

4. A material feeder for receiving uneven loadings of material and delivering the same at a uniform rate of discharge, said feeder including a base plate substantially bounded by hopper walls, a plurality of conveyor components sliding in convergent directions along said base plate and mounting transversely disposed conveyor flights at relatively spaced apart positions, said conveyors being arranged in relatively close relation at the discharge end of the feeder while being relatively widely spaced apart at the load receiving end of the feeder, said flights being arranged on said strands so as to gather the material loadings and to deliver the material at the discharge end of the feeder while intermeshing thereat, and a load flow control device comprising a plate disposed above said conveyors and running lengthwise of said feeder along the plan view center line thereof, said plate being plan-view shaped so as to leave the conveyor paths adjacent the intake end of said machine substantially uncovered and to progressively cover more substantial portions of the paths of said conveyors as they travel through the central portion of said feeder.

5. A material feeder for receiving batch loadings of material and delivering the same at more uniform rate of discharge, said feeder comprising a portable unit including a base plate, a plurality of conveyor components mounting transversely disposed conveyor flights at relatively spaced apart positions, said conveyors being arranged in relatively close relation at the discharge end of the feeder while being relatively widely spaced apart at the load receiving end of the feeder, said flights being arranged on said conveyors so as to gather the material loadings and to deliver the material at the discharge end of the feeder while intermeshing thereat, and a load flow control device disposed above said conveyors and running lengthwise of said feeder from a position at the intake end thereof along the plan view center line thereof, said device being disposed so as to leave the conveyor paths at the intake end of said machine substantially uncovered and to progressively cover more substantial portions of the paths of said conveyors as they approach the discharge end of said feeder.

6. A material feeder for receiving uneven loadings of material and delivering the same at a uniform rate of discharge, said feeder comprising a portable unit including a base plate substantially bounded by hopper walls and slotted in plan-view converging relation, a plurality of conveyor components each comprising an endless power chain having a top strand portion sliding within one of said slots and mounting transversely disposed conveyor flights at relatively spaced apart positions, said slots being arranged in relatively close relation at the discharge end of the feeder while being relatively widely spaced apart at the load receiving end of the feeder, said flights being arranged on said strands so as to gather the material loadings and to deliver the material at the discharge end of the feeder while intermeshing thereat, and a load flow control device disposed above said conveyor components and arranged to leave the conveyor paths at the intake end of said machine substantially uncovered and to progressively cover more substantial portions of the paths of said conveyors as they approach the discharge end of said feeder.

References Cited in the file of this patent

UNITED STATES PATENTS

| | | |
|---|---|---|
| 1,329,914 | McKenna | Feb. 3, 1920 |
| 2,619,216 | Kinnicutt | Nov. 25, 1952 |
| 2,828,851 | Thomas | Apr. 1, 1958 |